United States Patent
Wang et al.

(10) Patent No.: US 9,193,350 B2
(45) Date of Patent: Nov. 24, 2015

(54) METHOD OF ADAPTIVE CONTROL FOR ENGINE TRANSIENT MITIGATION IN A HYBRID VEHICLE

(75) Inventors: Qing Wang, Canton, MI (US); Fazal Urrahman Syed, Canton, MI (US); Ming Lang Kuang, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 891 days.

(21) Appl. No.: 13/439,930

(22) Filed: Apr. 5, 2012

(65) Prior Publication Data
US 2013/0268175 A1 Oct. 10, 2013

(51) Int. Cl.
*F02D 28/00* (2006.01)
*B60W 20/00* (2006.01)
*B60K 6/52* (2007.10)
*B60W 10/06* (2006.01)

(52) U.S. Cl.
CPC ............... *B60W 20/10* (2013.01); *B60K 6/52* (2013.01); *B60W 10/06* (2013.01); *B60W 2510/0666* (2013.01); *Y02T 10/6265* (2013.01)

(58) Field of Classification Search
CPC ............ B60W 20/10; B60W 10/06; B60W 2510/0666; B60K 6/52; Y02T 10/6265
USPC .......................................................... 701/22
See application file for complete search history.

(56) References Cited

U.S. PATENT DOCUMENTS

| | | | |
|---|---|---|---|
| 5,820,172 A * | 10/1998 | Brigham | B60K 6/485 180/65.26 |
| 6,367,570 B1 | 4/2002 | Long, III et al. | |
| 6,480,767 B2 * | 11/2002 | Yamaguchi | B60K 6/46 180/165 |
| 6,624,529 B2 * | 9/2003 | Obayashi | H02J 1/14 290/40 B |
| 6,879,054 B2 * | 4/2005 | Gosselin | 290/40 C |
| 7,206,687 B1 | 4/2007 | Huseman | |
| 7,273,439 B2 | 9/2007 | Kuang et al. | |
| 7,275,610 B2 | 10/2007 | Kuang et al. | |
| 7,576,501 B2 | 8/2009 | Okubo et al. | |
| 7,680,567 B2 | 3/2010 | Syed et al. | |
| 2001/0039230 A1 * | 11/2001 | Severinsky | B60H 1/004 477/3 |
| 2003/0173126 A1 * | 9/2003 | Gosselin | 180/65.3 |
| 2004/0015255 A1 * | 1/2004 | Davis | B61C 3/00 700/97 |
| 2006/0025906 A1 | 2/2006 | Syed et al. | |
| 2006/0030979 A1 | 2/2006 | Kuang et al. | |
| 2009/0118082 A1 | 5/2009 | Heap et al. | |
| 2009/0157244 A1 | 6/2009 | Kim | |
| 2009/0259355 A1 | 10/2009 | Li | |

(Continued)

FOREIGN PATENT DOCUMENTS

JP 11336581 A 12/1999

OTHER PUBLICATIONS

Brooking, P., Bumby, J.R., "An integrated engine-generator set with power electronic interface for hybrid electric vehicle applications," Publication Year: 2002 , pp. 153-158.*

(Continued)

*Primary Examiner* — Tuan C. To
(74) *Attorney, Agent, or Firm* — Brooks Kushman P.C.

(57) ABSTRACT

A hybrid vehicle and method of control are provided. An engine raw power command is quantized. The quantized power command is set to one of a plurality of quantized power steps. A step size between the quantized power steps varies based on the raw power command. The engine of the hybrid vehicle is operated based on the set quantized power command.

20 Claims, 6 Drawing Sheets

(56) References Cited

U.S. PATENT DOCUMENTS

| | | |
|---|---|---|
| 2010/0017054 A1 | 1/2010 | Okubo et al. |
| 2010/0023194 A1 | 1/2010 | Okubo et al. |
| 2010/0152936 A1 | 6/2010 | Wang et al. |
| 2010/0299009 A1 | 11/2010 | Falkenstein |

OTHER PUBLICATIONS

Di Cairano, S., Liang, W., Kolmanovsky, I.V., Kuang, M.L., Phillips, A.M., "Engine power smoothing energy management strategy for a series hybrid electric vehicle," Publication Year: 2011, pp. 2101-2106.*

United States Patent Office, Office Action issued for U.S. Appl. No. 13/007,700 mailed Dec. 3, 2012.

Science Direct, "Hybrid feedback stabilization of systems with quantized signals," http://www.sciencedirect.com, May 20, 2010, 3 pgs.

Science Direct, "Nonlinear Analysis: Optimal persistent disturbance attenuation control for linear hybrid," http://www.sciencedirect.com, May 20, 2010, 3 pgs.

Fazal U. Syed et al., "Fuzzy Gain-Scheduling Proportional-Integral Control for Improving Engine Power and Speed Behavior in a Hybrid Electric Vehicle", IEEE Transactions on Vehiclular Technology, Vo. 58, No. 1, Jan. 2009, pp. 69-84.

Clark G. Hochgraf et al., "Engine Control Strategy for a Series Hybrid Electric Vehicle Incorporating Load-Leveling and computer Controlled Energy Management", SAE International Technical paper, Published Feb. 1, 1996; 1 page—Abstract Only.

Non-Final Office Action dated Aug. 4, 2014 of corresponding U.S. Appl. No. 13/870,075, filed Apr. 25, 2013; 6 pages; First Named Inventor: Fazal Urrahman Syed.

* cited by examiner

METHOD OF ADAPTIVE CONTROL FOR ENGINE TRANSIENT MITIGATION IN A HYBRID VEHICLE

TECHNICAL FIELD

The present disclosure relates to a hybrid vehicle and a method of control.

BACKGROUND

FIG. 1 illustrates a block diagram of a conventional 'load-following' engine power determination architecture 10 for a hybrid-electric vehicle. In conventional architecture 10, an engine power command 12 is determined as the sum of a driver power command 14 and a battery power command 16. As such, in conventional architecture 10, the engine directly responds to any change of driver power command 14.

Accordingly, in real-world driving, any chaotic and aggressive driver power command 14 can easily generate perturbation of engine power command 12. The perturbation can be reflected as power fast-fluctuations and dithering. Such transients adversely affect the engine combustion efficiency and cost extra transient fuel. Further, many engine control parameters are 'predicatively' scheduled based on the rate of change of engine power command 12. Therefore, engine power disturbance may cause other non-optimum engine settings and deteriorate air/fuel errors. Even if the air/fuel (A/F) ratio can be kept within a moderate to narrow range, the integration effect of the fuel enrichments caused by more frequently occurring transients can be magnified and accumulated up to a considerable level of fuel losses.

SUMMARY

In at least one embodiment, a method of operating a hybrid vehicle is provided. The method includes quantizing an engine raw power command; and setting the quantized power command to one of a plurality of quantized power steps. A step size between the quantized power steps may vary based on the raw power command. The engine of the hybrid vehicle is operated based on the set quantized power command.

In another embodiment, a control system for a hybrid vehicle control system including an electric machine is provided. The control system includes a powertrain controller configured to: quantize an engine raw power command; and set the quantized power command to one of a plurality of quantized power steps. A step size between the quantized power steps may vary based on the raw power command. The controller operates the engine of the hybrid vehicle based on the set quantized power command.

In a further embodiment, 17 a method of operating a hybrid vehicle is provided. The method includes: quantizing a previous power command; and setting the previous quantized power command to one of a plurality of previous quantized power steps. The previous quantized power steps have a first step size between each of the previous quantized power steps. The hybrid vehicle engine is operated based on the set previous quantized power command. The method also includes quantizing a current power command; and setting the current quantized power command to one of a plurality of current quantized power steps. The current quantized power steps may have a second step size between each of the current quantized power steps that is different from the first step size. The hybrid vehicle engine is operated based on the set current quantized power command.

DETAILED DESCRIPTION

Detailed embodiments of the present invention are disclosed herein; however, it is to be understood that the disclosed embodiments are merely examples of the present invention that may be embodied in various and alternative forms. The figures are not necessarily to scale, some features may be exaggerated or minimized to show details of particular components. In addition, any or all features from one embodiment may be combined with any other embodiment. Therefore, specific structural and functional details disclosed herein are not to be interpreted as limiting, but merely as a representative basis for the claims and/or as a representative basis for teaching one skilled in the art to variously employ the present invention.

Figure 1:
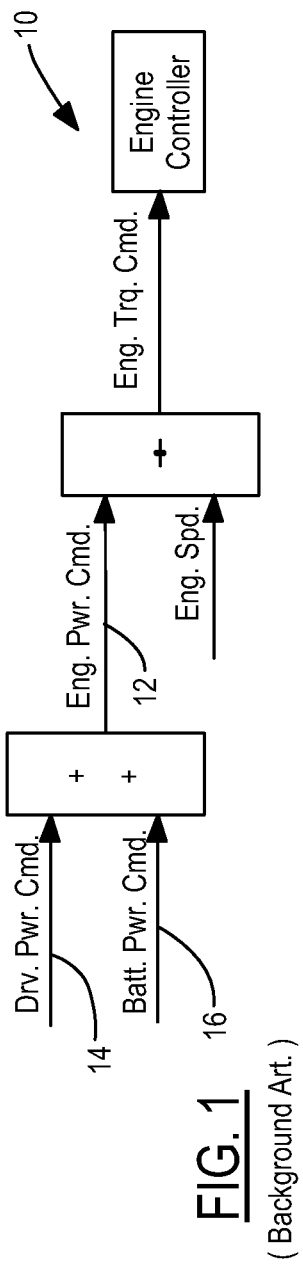
FIG. 1 illustrates a block diagram of a conventional 'load-following' engine power determination architecture for a hybrid electric vehicle.
Figure 2:
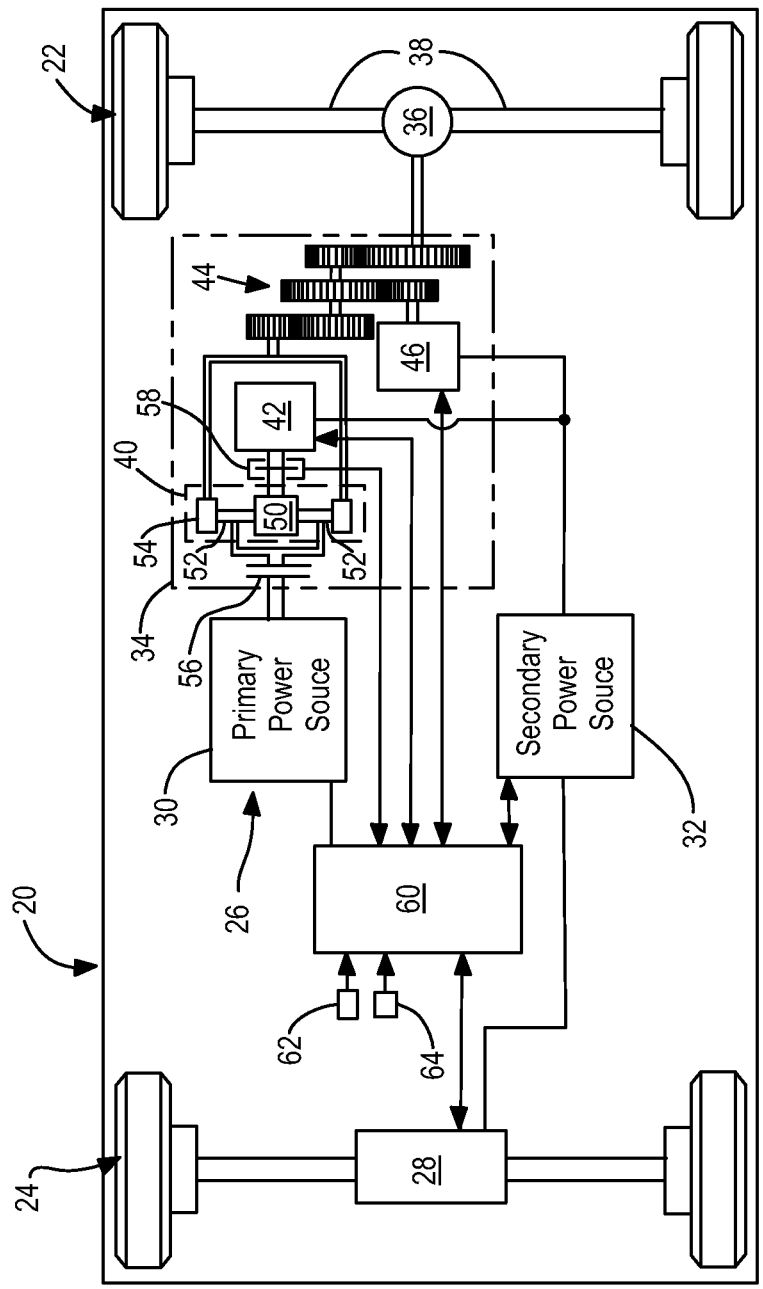
FIG. 2 illustrates a schematic of an hybrid-electric vehicle according to an embodiment of the disclosure.

Referring now to FIG. 2, a schematic of a hybrid vehicle 20 is shown. Hybrid vehicle 20 includes a first wheel set 22, a second wheel set 24, and a wheel drive system or drivetrain 26.

Drivetrain 26 may be configured to drive or actuate first and/or second wheel sets 22, 24. Drivetrain 26 may have any suitable configuration, such as a series drive, split hybrid drive, or dual mode split as is known by those skilled in the art. Drivetrain 26 has a power split drive configuration in the embodiment shown in FIG. 2.

Drivetrain 26 may be configured to drive or provide torque to first and/or second wheel sets 22 and 24. In the embodiment shown, first wheel set 22 is configured to be driven by drivetrain 26 while second wheel set 24 is configured to be driven by an electrical machine 28, such as an electric motor. Alternatively, second wheel set 24 may be provided without electrical machine 28.

Hybrid vehicle 20 may include any suitable number of power sources. In the embodiment shown in FIG. 2, hybrid vehicle 20 includes a primary power source 30 and a secondary power source 32.

Primary power source 30 may be any suitable energy generation device, such as an internal combustion engine that may be adapted to combust any suitable type of fuel like gasoline, diesel fuel, or hydrogen.

Secondary power source 32 may be of any suitable type. For example, secondary power source 32 may be electrical, non-electrical, or combinations thereof. An electrical power source such as a battery, a battery pack having electrically interconnected cells, a capacitor, or a fuel cell may be utilized. If a battery is used it may be of any suitable type, such as nickel-metal hydride (Ni-MH), nickel-iron (Ni—Fe), nickel-cadmium (Ni—Cd), lead acid, zinc bromide (Zu-Br), or lithium based. If a capacitor is used it may be of any suitable type, such as an ultra capacitor, super capacitor, electrochemical capacitor, or electronic double layer capacitor. A non-electrical power source may be a device whose energy may be converted to electrical or mechanical energy. For instance, a hydraulic power source or mechanical power source such as a flywheel, spring, engine, or compressed gases may store energy that may be converted or released as electrical or mechanical energy as needed. For simplicity, the description below will primarily refer to an embodiment of the present disclosure that incorporates an electrical power source.

Primary and secondary power sources 30, 32 may be adapted to provide power to a power transfer system 34 and/or electrical machine 28. Power transfer system 34 is adapted to drive one or more vehicle wheels. In at least one embodiment, power transfer system 34 may be connected to a differential 36 in any suitable manner, such as with a driveshaft, chain, or other mechanical linkage. Differential 36 may be connected to each wheel of first wheel set 22 by one or more shafts 38, such as an axle or halfshaft.

Power transfer system 34 may include various mechanical, electrical, and/or electro-mechanical devices. In the embodiment shown, power transfer system 34 includes a planetary gear assembly 40, a first electrical machine 42, a power transfer unit 44, and a second electrical machine 46 as primary components.

Planetary gear assembly 40 may have any suitable configuration. In the embodiment shown, planetary gear assembly 40 includes a sun gear 50, a plurality of planet gears 52, and a ring gear 54.

Primary power source 30 may be selectively coupled to planetary gear assembly 40 via a clutch 56. Clutch 56 may be of any suitable type, such as a one way clutch that permits primary power source 30 to drive planetary gear assembly 40. If clutch 56 is engaged, primary power source 30 may rotate planet gears 52. Rotation of planet gears 52 may then rotate ring gear 54. Ring gear 54 may be coupled to power transfer unit 44 that is coupled to differential 36 for transmitting torque to vehicle wheels to propel hybrid vehicle 20. Power transfer unit 44 may include a plurality of gear ratios that may be engaged to provide a desired vehicle response.

First electrical machine 42, which may be a motor or motor-generator, may be coupled to sun gear 50 to provide a torque to supplement or counteract torque provided by primary power source 30. A brake 58 may be provided to reduce the speed and/or the transmission or torque from first electrical machine 42 to sun gear 50.

Second electrical machine 46 may be powered by secondary power source 32 and/or first electrical machine 42. Second electrical machine 46, which may be a motor, may be coupled to power transfer unit 44 to propel hybrid vehicle 20.

One or more controllers 60 may monitor and control various aspects of hybrid vehicle 20. For simplicity, a single controller 60 is shown; however, multiple controllers may be provided for monitoring and/or controlling the components, systems, and functions described herein.

Controller 60 may communicate with primary power source 30, secondary power source 32, and electrical machines 42, 46 to monitor and control their operation and performance. Controller 60 may receive signals indicative of engine speed, engine torque, vehicle speed, electrical machine speed, electrical machine torque, and operational state of secondary power source 32 in a manner known by those skilled in the art. For example, engine speed may be detected by an engine speed sensor adapted to detect the rotational speed or rotational velocity of an associated component. Such a speed sensor may be incorporated with primary power source 30 to detect the rotational speed or velocity of an output shaft of the primary power source. Alternatively, a speed sensor may be disposed in drivetrain 26 downstream of primary power source 30.

Controller 60 may receive input signals from other components or subsystems. For example, controller 60 may receive a signal indicative of vehicle acceleration that is requested by a driver or by a vehicle system, such as an active or intelligent cruise control system. Such a signal may be provided by or based on a signal from an input device or sensor 62, such as an accelerator pedal sensor or cruise control input device.

Controller 60 may also receive a signal indicative of vehicle deceleration that is requested by a driver or by a vehicle system, such as an active or intelligent cruise control system. Such a signal may be provided by or based on a signal from an input device or sensor 64, such as a brake pedal sensor or cruise control input device.

Acceleration and deceleration requests may be used to assess whether a "tip-in" event or a "tip-out" event has occurred. A tip-in event indicates that additional power or vehicle acceleration is demanded. A tip-out event indicates that less power or vehicle deceleration is demanded. For example, a tip-in event may be indicated by actuation of an accelerator pedal. Similarly, a tip-out event may be indicated by braking of the vehicle, lifting off an accelerator pedal, or combinations thereof.

In a hybrid vehicle, acceleration (tip-in) and deceleration (tip-out) events lead to a change in the power provided to actuate vehicle wheels. In general, an acceleration request increases power consumption demand and a deceleration request reduces power consumption demand. This change in power demand may result in a transient condition or state in which the operational characteristics of at least one power source are changed to provide an increased or reduced amount of power.

In a hybrid vehicle having an engine, the engine power may be a function of engine output torque and engine speed (e.g., power=torque*speed). During transient conditions, reduced fuel economy may occur if the engine torque and the engine speed are not intelligently controlled. Fuel economy shortcomings may be magnified by aggressive driving with more frequent tip-in and/or tip-out events. The present disclosure may help provide improved fuel economy as compared to existing methodologies by providing an improved method of control.

Figure 3:
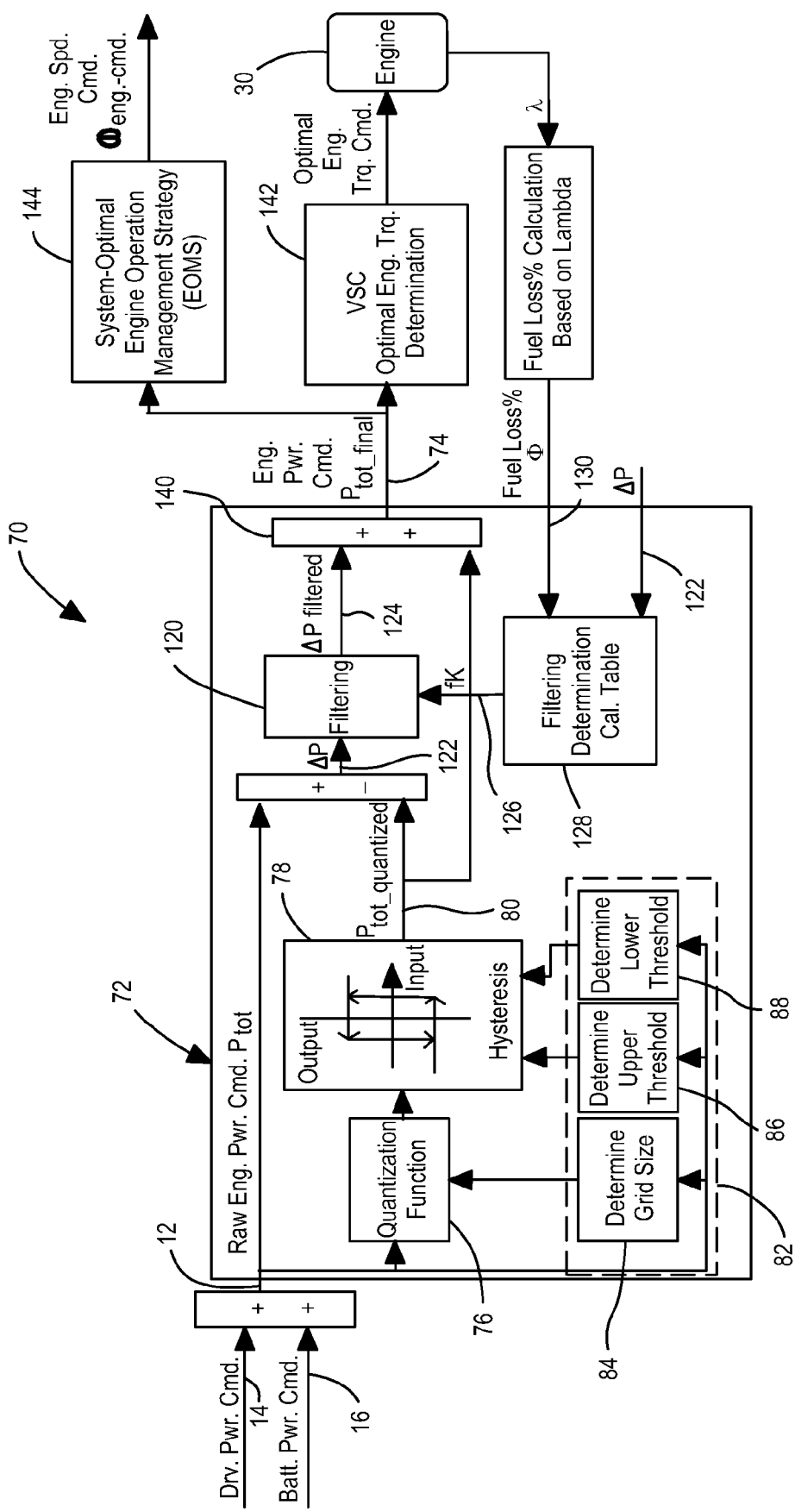
FIG. 3 illustrates a block diagram of an improved engine power determination architecture configured to implement an adaptive method of control for engine transient mitigation in a hybrid-electric vehicle in accordance with an embodiment of the disclosure.

Referring to FIG. 3, a block diagram of an improved engine power determination architecture 70 configured to implement a method of control for engine transient mitigation in a hybrid vehicle in accordance with an embodiment of the present disclosure is shown. Improved architecture 70 will be described with reference to an embodiment of a hybrid vehicle having an engine as a primary power source and a battery as a secondary source; however, it is to be understood that other primary and secondary power sources may be employed as described above in various embodiments.

The method of control for engine transient mitigation implemented by improved architecture 70 includes adaptive engine power command quantization and filtering processes. A goal of the engine transient mitigation method is to effectively smooth out the profile of the engine power command and let the battery power fill in the high frequency and chaotic component of the drive power. The adaptive process parameters change and adapt based on the level of the engine power command.

Compared to conventional architecture, improved architecture 70 performs the following additional processes to profile engine power command: (i) an adaptive engine power command quantization with an adaptive hysteresis process (described below with reference to FIG. 7); and (ii) a quantized engine power command filtering process (described below with reference to FIG. 8).

Improved architecture 70, which may be implemented in controller 60, includes an adaptive engine power command quantization and filtering module 72. In general, module 72 receives as an input a raw engine power command ($P_{tot}$) 12 and performs on engine power command ($P_{tot}$) 12 the engine power command quantization with hysteresis process and the quantized engine power command filtering process to generate as an output a smoothed-out engine power command ($P_{tot\_final}$) 74. In both conventional architecture 10 and improved architecture 70, engine power command ($P_{tot}$) 12 is determined as the sum of driver power command 14 and battery power command 16. However, in improved architecture 70, smoothed-out engine power command ($P_{tot\_final}$) 74 as opposed to engine power command ($P_{tot}$) 12 is outputted to determine an engine torque command.

The adaptive quantization and filtering module 72 includes a quantizer 76 and a hysteresis logic 78. Quantizer 76 and hysteresis logic 78 perform on engine power command ($P_{tot}$) 12 the engine power command quantization with hysteresis process (described below with reference to FIG. 7) to generate as an output a quantized engine power command ($P_{tot\_quantized}$) 80.

The adaptive quantization and filter module 72 also includes an adaptive logic module 82. The adaptive logic module 82 helps adjust the engine power grid size based on changes of the input of the total engine power command ($P_{tot}$) 12. If the quantization function always uses constant power grid, or fixed power discrete levels, the fixed levels are not only difficult to calibrate, but also may not always fit different types of driving situations. For instance, when the engine is already operating at its high-efficient island, a quantization method with constant gird may cause unnecessary electric re-circulation losses which may adversely hurt the fuel economy, especially when the driver power demand is high. The adaptive logic module 82 may adaptively adjust the powertrain efficiency to fit all driving situations.

The adaptive logic module 82 applies variable power grid sizes in an adaptive on grid size function 84 to the quantization function 76. The adaptive logic module 82 also applies variable thresholds to the hysteresis logic 78 with an adaptive upper threshold function 86 and an adaptive lower threshold function 88. It should also be pointed out that the adaptive grid size function 84 may be applied simultaneously with the adaptive upper threshold function 86 and the adaptive lower threshold function 88.

Figure 6:
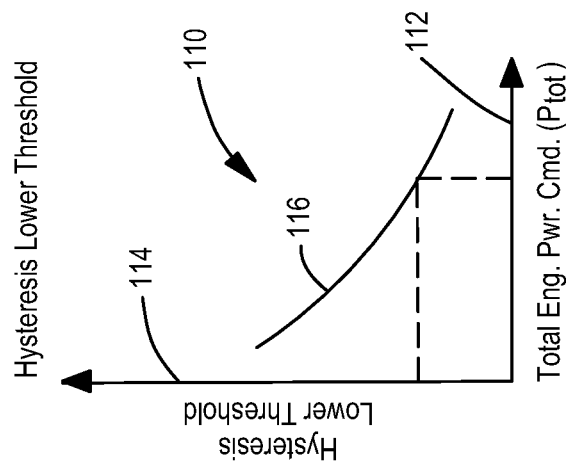
FIGS. 4-6 illustrate examples of calibration tables for use in the engine power determination architecture of FIG. 3.
Figure 5:
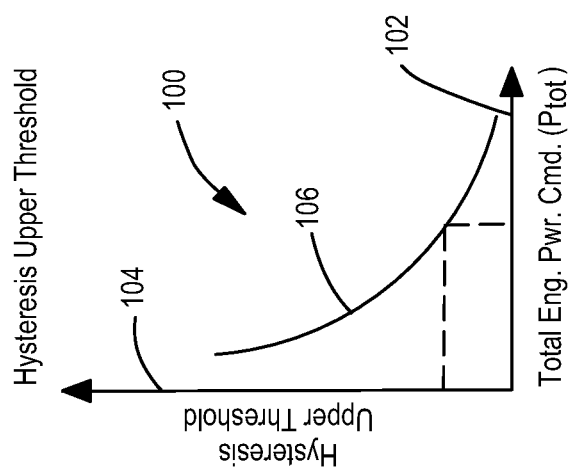
Figure 4:
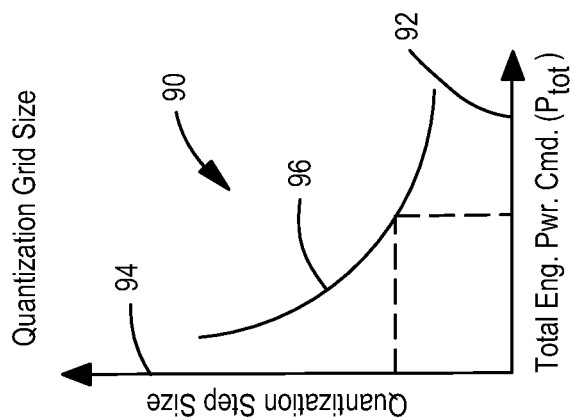

As illustrated in FIGS. 4 through 6, the adaptive logic module 82 may use calibration tables based on total engine power command ($P_{tot}$) 12. FIG. 4 illustrates a quantization grid size look up table 90. As shown, the input 92 is the total engine power command ($P_{tot}$) 12 and the output 94 is the quantization step size. The look up table 90 may include a quantization grid size calibration curve 96. In one embodiment, the calibration curve 96 has a monotonic shape and a decreasing trend. Such a shape may be defined because if the engine power command ($P_{tot}$) 12 is greater, the engine efficiency should be relatively higher. Therefore, at higher engine power command ($P_{tot}$) 12, it may be less necessary for the engine to stay on the discrete power grids, so the quantization grid size is reduced. In other words, it may be desirable to allow engine transients at certain high engine efficiency regions. As such, the quantization grid size may be smaller at high engine power command ($P_{tot}$) 12 so that the engine can freely operate at a wider power region to reduce electrical losses.

FIG. 5 and FIG. 6 respectively illustrate a hysteresis upper threshold look up table 100 and lower threshold look up table 110. Like in FIG. 4, the inputs 102, 112 are the total engine power command ($P_{tot}$) 12. In FIG. 5, the output 104 is the hysteresis upper threshold. Similarly, in FIG. 6, output 114 is the hysteresis lower threshold. The hysteresis threshold look up tables 100, 110 include hysteresis threshold calibration curves 106, 116 respectively. In one embodiment, the hysteresis calibration curves 106, 116 have a monotonic shape and a decreasing trend. However, the upper threshold calibration curve 106 may be different than the lower threshold calibration curve 116. As such, for a given engine power command ($P_{tot}$) 12, the hysteresis upper threshold may be different than the hysteresis lower threshold.

Adaptive quantization and filtering module 72 further includes a filter 120. Filter 120 performs the quantized engine power command filtering process (described below with reference to FIG. 8) by smoothing out through low pass filtering the power difference ($\Delta P$) 122 between engine power command ($P_{tot}$) 12 and quantized engine power command ($P_{tot\_quantized}$) 80 to generate as an output a filtered power difference ($\Delta P_{filtered}$) 124. Quantized engine power command ($P_{tot\_quantized}$) 80 and filtered power difference ($\Delta P_{filtered}$) 124 are then summed to generate smoothed-out engine power command ($P_{tot\_final}$) 74, which is outputted from quantization and filtering module 72 for use in determining an engine torque command.

In smoothing out the power difference ($\Delta P$) 122 to generate filtered power difference ($\Delta P_{filtered}$) 124, filter 120 uses a filter constant (fk) 126 supplied by a filtering determination calculation table 128 of adaptive quantization and filtering module 72. As described in greater detail below, filter constant (fk) 126 is adaptively determined based on the amplitude of power difference ($\Delta P$) 122 and a fuel loss % ($\phi$) 130. Fuel loss % ($\phi$) 130 is calculated online based on the closed-loop feed back lambda ($\lambda$) A/F ratio.

Figure 7:
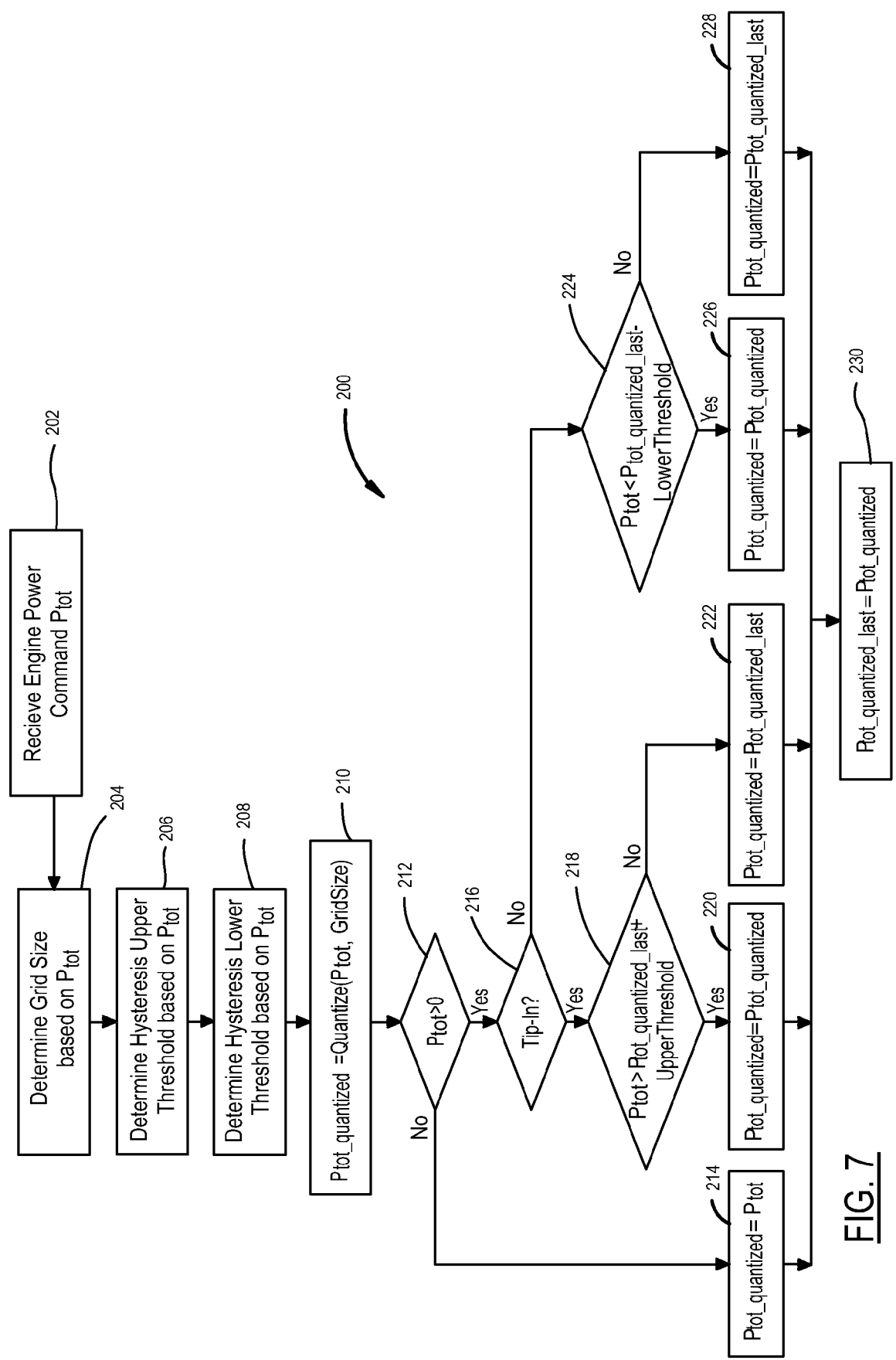
FIG. 7 illustrates a flowchart describing operation of the engine power command quantization with hysteresis process of the method of control for engine transient mitigation.
Figure 8:
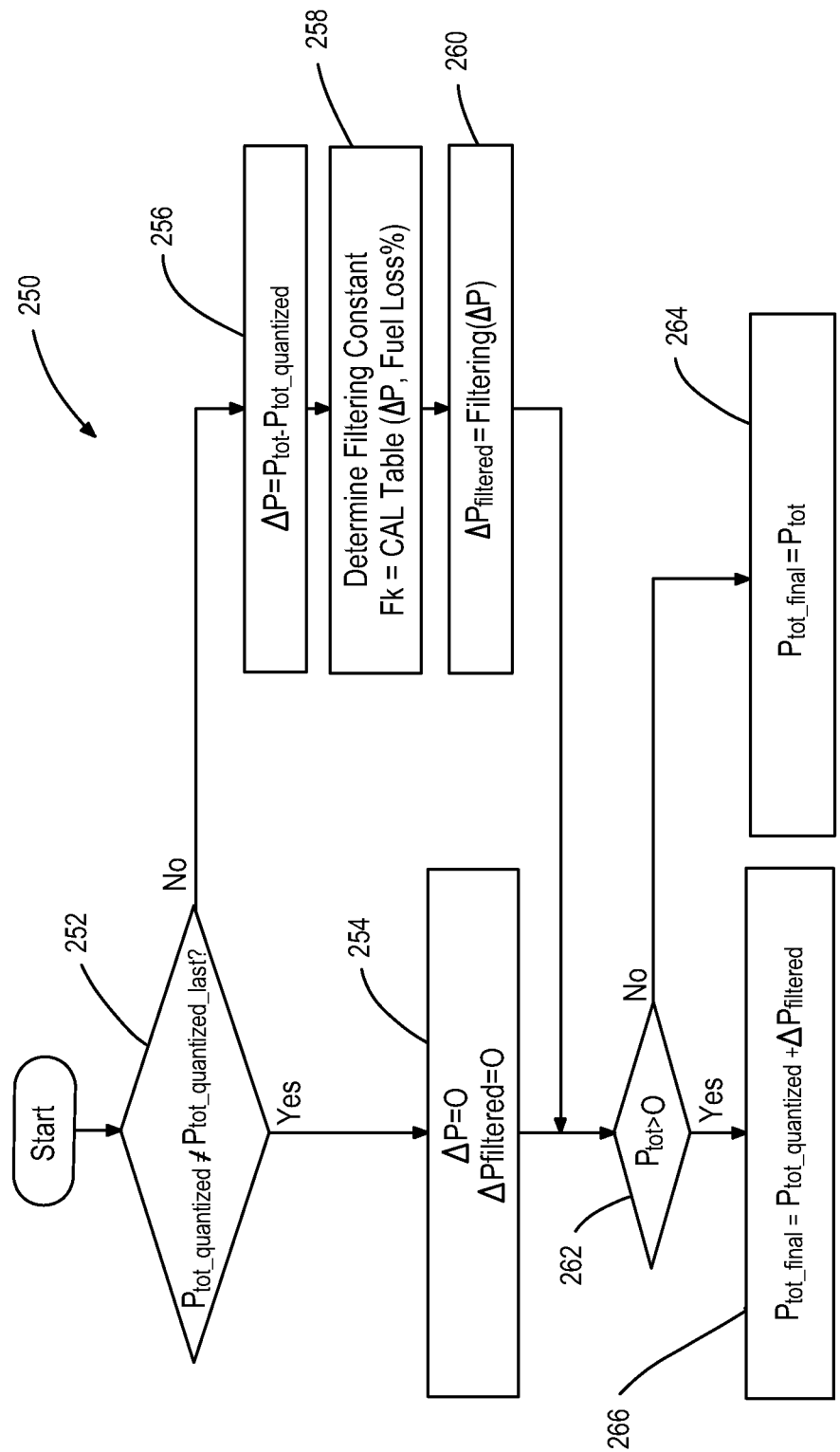
FIG. 8 illustrates a flowchart describing operation of the quantized engine power command filtering process of the method of control for engine transient mitigation.

FIGS. 7 and 8 illustrate flowcharts 200 and 250 respectively describing operation of the engine power command adaptive quantization with adaptive hysteresis process and the quantized engine power command filtering process of the method of control for engine transient mitigation.

As will be appreciated by one of ordinary skill in the art, flowcharts 200 and 250 represent control logic which may be implemented using hardware, software, or a combination thereof. For example, the various functions may be performed using a programmed microprocessor. The control logic may be implemented using any of a number of known programming or processing techniques or strategies and is not limited to the order of sequence illustrated. For instance, interrupt or event-driven processing is employed in real-time control applications, rather than a purely sequential strategy as illustrated. Likewise, pair processing, multitasking, or multithreaded systems and methods may be used to accomplish the objectives, features, and advantages of the present disclosure.

The present disclosure is independent of the particular programming language, operating system processor, or circuitry used to develop and/or implement the control logic illustrated. Likewise, depending upon the particular programming language and processing strategy, various functions may be performed in the sequence illustrated at substantially the same time or in a different sequence while accomplishing the features and advantages of the present invention. The illustrated functions may be modified or in some cases omitted without departing from the spirit or scope of the present disclosure.

Referring now to FIG. 7, with continual reference to improved architecture 70 shown in FIG. 3, flowchart 200 describes an adaptive quantization strategy of the engine power command quantization with hysteresis process of the engine transient mitigation method. This adaptive quantization strategy 200 is performed by quantizer 76, hysteresis logic 78 and adaptive logic module 82 of adaptive quantization and filtering module 72.

This process provides a power quantization flow designed to discretize raw engine power command ($P_{tot}$) 12 into adaptive (calibratable) grids. When engine power command ($P_{tot}$) 12 fluctuates, the engine power command varies the discrete power grid size based on the engine power command ($P_{tot}$) 12. For example, for a low engine power command ($P_{tot}$) 12 of 12 kW, the adaptive grid size may be 5 kW so that any engine command ripple with a 'change amplitude' smaller than 5 kW will be filtered out. Instead, the battery power fills in the transient power demand. But for a high engine power command ($P_{tot}$) 12 of 30 kW, for example, the adaptive grid size may be 1 kW so that any engine power command ripple with a 'change amplitude' smaller than only 1 kW will be filtered out. Therefore, at higher power commands, the ($P_{tot}$) 12 may more closely approach the quantitized power command ($P_{tot\_quantized}$) 80.

Hysteresis logic is also embedded within the engine power command quantization with adaptive hysteresis process to prevent the quantized engine power command from unintended fast-switching between two adjacent adaptive quantization grids. When engine power command ($P_{tot}$) 12 fluctuates, the engine power command also varies the hysteresis thresholds based on the engine power command ($P_{tot}$) 12. During a tip-in event, at iteration n, only if the 'amplitude increase' of engine power command ($P_{tot}$) 12 exceeds the previous quantized engine power command (recorded from a previous iteration (n−1)) more than an upper-bound threshold, then the quantized engine power command will be updated accordingly. Otherwise, the quantized engine power command remains the same as the previous iteration. Similarly, a lower-bound threshold is used in the hysteresis logic for tip-out events. Like the grid size, the upper-bound threshold and the lower-bound threshold are adaptively adjusted based on the engine power command ($P_{tot}$) 12.

For example, assuming the power quantization grid step size is 10 kW and the hysteresis threshold is, any engine command ripple with a 'change amplitude' smaller than 5 kW will be filtered out. Instead, the battery power fills in the transient demand.

The operation of the adaptive engine power command quantization with adaptive hysteresis process begins by receiving an engine power command ($P_{tot}$), as represented by block 202. Based on the engine power command ($P_{tot}$), the adaptive grid size function 84 determines the grid size, as represented by block 204. The gridsize value is indicative of the step size for each quantization grid.

In block 206, the adaptive upper threshold function 86 determines the upper threshold based on the engine power command ($P_{tot}$). The upper-threshold value is indicative of an engine power command 'amplitude increase' threshold for tip-in events. Likewise, in block 208, the adaptive lower threshold function 88 determines the lower threshold based on the engine power command ($P_{tot}$). The lower-threshold value is indicative of an engine power command 'amplitude decrease' threshold for tip-out events.

In block 210, during a current iteration 'n', quantizer 76 performs quantizes engine power command ($P_{tot}$) 12 as a function of the adaptive grid size to generate quantized engine power command ($P_{tot\_quantized}$) for current iteration 'n'.

In block 212, engine power command ($P_{tot}$) 12 is determined whether to be greater than zero. If engine power command ($P_{tot}$) is not greater than zero in block 212, then the outputted quantized engine power command ($P_{tot\_quantized}$) 80 is set to be engine power command ($P_{tot}$) 12 (i.e., $P_{tot\_quantized} = P_{tot}$) in block 214. If engine power command ($P_{tot}$) is greater than zero in block 212, then the process continues to block 216.

In block 216 it is determined whether there is a tip-in event. If there is a tip-in event in block 216, then the hysteresis logic 78 determines if engine power command ($P_{tot}$) 12 is greater than the sum of the previous quantized engine power command ($P_{tot\_quantized\_last}$) (recorded by quantizer 76 during the previous iteration 'n−1') and the adaptive upper-threshold value determined from block 206 (i.e., $P_{tot} > P_{tot\_quantized\_last} + $ UpperThreshold) as shown in block 218. If yes in block 218, then the outputted quantized engine power command ($P_{tot\_quantized}$) 80 is set to be the quantized engine power command ($P_{tot\_quantized}$) generated in block 212 for the current iteration 'n' (i.e., $P_{tot\_quantized} = P_{tot\_quantized}$) as shown in block 220. If no in block 218, then the outputted quantized engine power command ($P_{tot\_quantized}$) 80 is set to be the previous quantized engine power command ($P_{tot\_quantized\_last}$) (i.e., $P_{tot\_quantized} = P_{tot\_quantized\_last}$) as shown in block 222.

Turning back to block 216, if there is no tip-in in block 216, thereby implying that there is a tip-out event, then hysteresis logic 78 determines if engine power command ($P_{tot}$) 12 is less than the difference of the previous quantized engine power command ($P_{tot\_quantized\_last}$) subtracted by the adaptive lower-threshold value (i.e., $P_{tot} < P_{tot\_quantized\_last} - $ LowerThreshold) as shown in block 224. If yes in block 224, then the outputted quantized engine power command ($P_{tot\_quantized}$) 80 is set to be the quantized engine power command ($P_{tot\_quantized}$) generated in block 210 for the current iteration 'n' (i.e., $P_{tot\_quantized} = P_{tot\_quantized}$) as shown in block 226. If no in block 224, then the outputted quantized engine power command ($P_{tot\_quantized}$) 80 is set to be the previous quantized engine power command ($P_{tot\_quantized\_last}$) (i.e., $P_{tot\_quantized} = P_{tot\_quantized\_last}$) as shown in block 228.

Finally, in block 230, the previous quantized engine power command ($P_{tot\_quantized\_last}$) is updated to be the outputted quantized engine power command ($P_{tot\_quantized}$) 80 (obtained from the applicable one of blocks 214, 220, 222, 226, and 228 for the current iteration) (i.e., $P_{tot\_quantized\_last} = P_{tot\_quantized}$). In turn, the updated previous quantized engine power command is used for the subsequent iteration (i.e., n+1) of engine power command ($P_{tot}$) 12 at a succeeding point of time.

Referring now to FIG. 8, with continual reference to improved architecture 70 shown in FIG. 3, flowchart 250 describes operation of the quantized engine power command filtering process of the engine transient mitigation method is shown. This process is performed by filter 120 of adaptive quantization and filtering module 72.

Initially, filter 120 has access to outputted quantized engine power command ($P_{tot\_quantized}$) 80 and the previous quantized engine power command ($P_{tot\_quantized\_last}$). As indicated above with reference to FIG. 3, filter 120 receives as an input the power difference (ΔP) 122 between engine power command ($P_{tot}$) 12 and outputted quantized engine power command ($P_{tot\_quantized}$) 80 (i.e., $\Delta P = P_{tot} - P_{tot\_quantized}$). Filter 120 also receives as an input the filter constant (fk) 126 supplied by filtering determination calculation table 128.

The operation of the quantized engine power command filtering process begins with filter 120 determining whether outputted quantized engine power command ($P_{tot\_quantized}$) 80 and the previous quantized engine power command ($P_{tot\_quantized\_last}$) have a different value (i.e., $P_{tot\_quantized} \neq P_{tot\_quantized\_last}$) as shown in block 252. If outputted quantized engine power command ($P_{tot\_quantized}$) 80 and the previous quantized engine power command ($P_{tot\_quantized\_last}$) have the same value, then filter 120 resets power difference ($\Delta P$) 122 to zero and sets a filtered power difference ($\Delta P_{filtered}$) 124 to be zero (i.e., $\Delta P = 0$ and $\Delta P_{filtered} = 0$) as shown in block 254. If outputted quantized engine power command ($P_{tot\_quantized}$) 80 and the previous quantized engine power command ($P_{tot\_quantized\_last}$) have the a different value, then filter 120 sets power difference ($\Delta P$) 122 to be the difference between engine power command ($P_{tot}$) 12 and outputted quantized engine power command ($P_{tot\_quantized}$) 80 (i.e., $\Delta P = P_{tot} - P_{tot\_quantized}$) in block 256. In block 258, filter 120 obtains the filtering constant (fk) 126. In block 260, filter 120 filters the power difference ($\Delta P$) obtained from block 256 as a function of the filtering constant (fk) 126 to generate filtered power difference ($\Delta P_{filtered}$) 124.

Upon completion of block 254 or block 260, filter 120 outputs filtered power difference ($\Delta P_{filtered}$) 124 to a summation segment 140 of adaptive quantization and filtering module 72. The outputted filtered power difference ($\Delta P_{filtered}$) 124 is zero if outputted from block 254. The outputted filtered power difference ($\Delta P_{filtered}$) 124 is the power difference ($\Delta P$) obtained from block 256 filtered as a function of the filtering constant (fk) 126 if outputted from block 260.

The process from both blocks 254 and 260 continues to block 262 where it is determined whether engine power command ($P_{tot}$) 12 is greater than zero (i.e., $P_{tot} > 0$?). If no, then engine power command ($P_{tot\_final}$) 74, which will be outputted from adaptive quantization and filtering module 72, is set to be engine power command ($P_{tot}$) 12 (i.e., $P_{tot\_final} = P_{tot}$) as shown in block 264. If yes, then engine power command ($P_{tot\_final}$) 74, which again will be outputted from adaptive quantization and filtering module 72, is set to be the sum of quantized engine power command ($P_{tot\_quantized}$) 80 and filtered power difference ($\Delta P_{filtered}$) 124 (i.e., $P_{tot\_final} = P_{tot\_quantized} + \Delta P_{filtered}$) as shown in block 266. Again, summation segment 140 of adaptive quantization and filtering module 72 sums quantized engine power command ($P_{tot\_quantized}$) 80 and filtered power difference ($\Delta P_{filtered}$) 124 and then outputs engine power command ($P_{tot\_final}$) 74, which is the sum of these two variables.

As shown in FIG. 3, adaptive quantization and filtering module 72 provides engine power command ($P_{tot\_final}$) 74 to a VCS 142 (e.g., another part of controller 60). VCS 142 determines an optimal engine torque command for engine 30 based on engine power command ($P_{tot\_final}$) 74. Adaptive quantization and filtering module 72 may also provide engine power command ($P_{tot\_final}$) 74 to a EOMS 144 (e.g., another part of controller 60). EOMS 144 determines an engine speed command based on engine power command ($P_{tot\_final}$) 74.

The design rationale of filtering determination calculation table 128 will now be explained in greater detail. When the power difference ($\Delta P$) is small, a fast filtering is applied. That means that a small amplitude of engine power command variation is allowed to some extent as it is less influential in triggering combustion transients. When the power difference ($\Delta P$) is large, a slow filtering is applied so that large command fluctuations and abrupt changes are heavily smoothed in open-loop to mitigate potential combustion inefficiency. On the other hand, the higher the fuel loss % ($\phi$), the slower the filtering is needed to further suppress fast transients. Such a closed-loop mechanism guarantees smooth engine power as soon as a big enrichment A/F error is detected.

It is noted that a reset is applied to the power difference ($\Delta P$) and the filtered power difference ($\Delta P_{filtered}$) (block 254 of FIG. 8) if $P_{tot\_quantized} \neq P_{tot\_quantized\_last}$ which indicates there is a truly desired engine power change from the driver. Therefore, the outputted engine power command ($P_{tot\_final}$) is allowed to jump to a new point on the quantized power grid.

In sum, after adaptive quantization and filtering of the inputted engine power command ($P_{tot}$) 12, the final outputted profiled engine power command ($P_{tot\_final}$) 74 is determined as the sum of quantized engine power command ($P_{tot\_quantized}$) 80 and filtered power difference ($\Delta P_{filtered}$) 124 (i.e., $P_{tot\_final} = P_{tot\_quantized} + \Delta P_{filtered}$).

Figure 9:
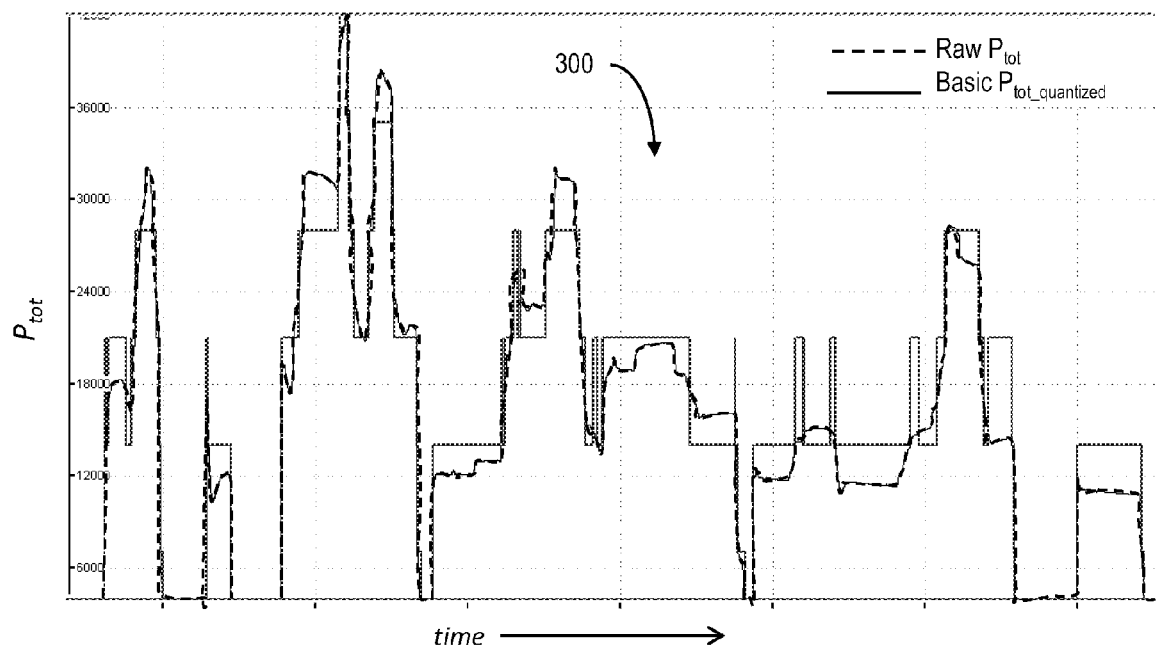
FIGS. 9-10 illustrate a graphical representation illustrating simulation results of methods of controlling engine transient mitigation.
Figure 10:
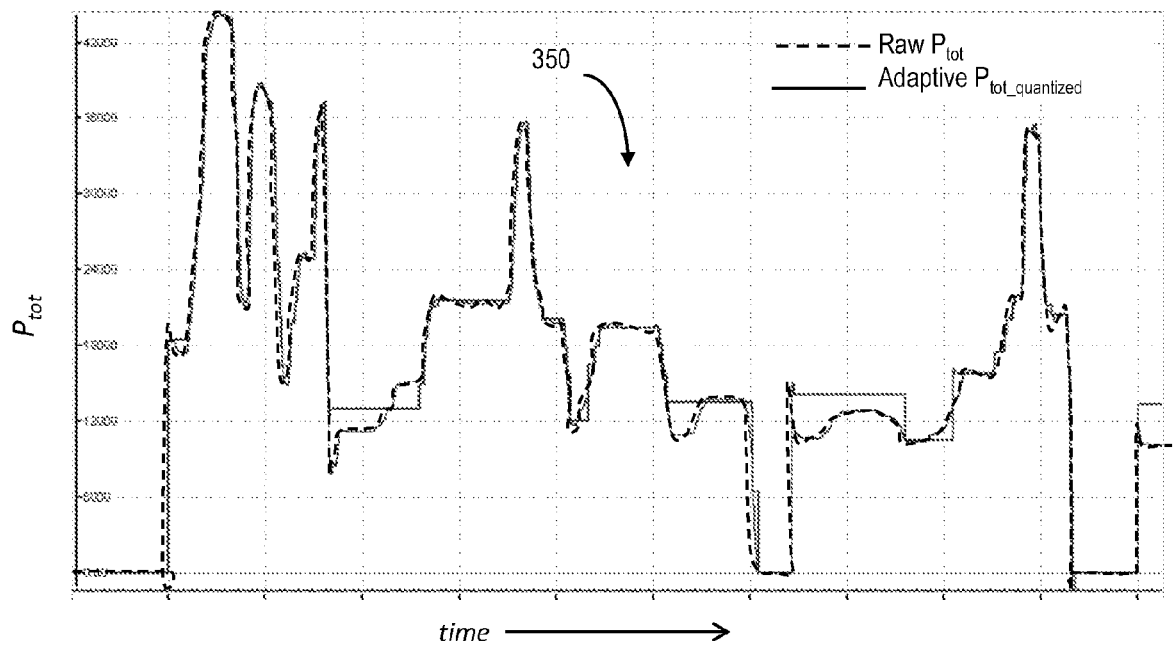

Referring now to FIGS. 9 and 10 are graphical representations 300 and 350 illustrating simulation results of the method of control for engine transient mitigation is shown. FIG. 9 is the graphical representation 300 that illustrates a quantization and filtering module 72 that does not include an adaptive logic module 82. The graphical representation 300 compares the 'raw engine power command' versus the 'final profiled engine power command' outputted from quantization and filtering module 72. In this simulated example shown in FIG. 9, this basic quantization strategy outputting quantized engine power command ($P_{tot\_quantized}$) 80 without an adaptive logic module 82 overrides the raw engine power command ($P_{tot}$) 12 into pre-determined (calibratable) discrete power levels at all power ranges, including the high power. When the engine power command ($P_{tot}$) 12 fluctuates around the power grids, the quantized power signal would remain on the discrete levels to eliminate transient changes.

FIG. 10, in contrast, is the graphical representation 350 that illustrates a adaptive quantization and filtering module 72 that includes an adaptive logic module 82. The adaptive quantization strategy adaptively varies the discrete power gird size based on the engine power command ($P_{tot}$) 12. As observed in the simulated example shown in FIG. 10, at high power levels, the quantized engine power command ($P_{tot\_quantized}$) 80 approaches closely to the raw engine power command ($P_{tot}$) 12.

In the adaptive quantization strategy, such as the simulation shown in FIG. 10, the battery does not need to absorb the transient power changes and therefore the recirculation losses are reduced. In addition, the adaptive quantization strategy may help effectively balance the trade-off between long-term electrical re-circulation losses and instant fuel efficiency, which is especially important when the engine efficiency is relatively high and the benefit of electric assist becomes less dominant. The adaptive quantization strategy illustrated in FIG. 10 also minimize engine transients when power demand is low, while allowing engine transients at the engine's high efficient region. The benefits of the adaptive quantization strategy illustrated in FIG. 10 may further improve fuel efficiency over the basic quantization strategy in FIG. 9.

the adaptive quantization strategy also provides the general benefits of mitigating engine transients including: smoothing out engine operations and eliminating unnecessary engine combustion transients in open-loop to benignly mitigate A/F enrichments; using the battery to absorb driver power's 'perturbation' and deal with driver power's high frequency and chaotic component; and adaptively optimizing engine power between 'load-leveling' and 'load-following' to further improve fuel economy.

While various embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed:

1. A method of operating a hybrid vehicle comprising:
converting a raw power command for an engine into a quantized power command;
selecting one of a plurality of quantized power steps to meet the quantized power command,
wherein a step size between the quantized power steps varies based on the raw power command; and
operating the engine at the quantized power step selected.

2. The method of claim 1 further comprising:
operating the engine at a second quantized power step if the quantized power command falls between a first quantized power step and the second quantized power step and varies by more than a threshold value from the first quantized power step.

3. The method of claim 2 further comprising:
operating the engine at the first quantized power step if the quantized power command falls between the first and the second quantized power steps and varies less than a threshold value from the first quantized power step.

4. The method of claim 2 wherein:
the threshold value varies in an inverse relationship based on the raw power command such that the threshold value is smaller for a greater raw power command than for a smaller raw power command.

5. The method of claim 2 wherein:
the threshold value varies based on the raw power command.

6. The method of claim 2 wherein:
the threshold value comprises an upper threshold value and a lower threshold value which vary based on the raw power command.

7. The method of claim 1 wherein:
the step size varies based on the raw power command in an inverse relationship such that the step size is smaller for a greater raw power command than for a lesser raw power command.

8. The method of claim 1 further comprising:
selecting a first set of quantized power steps, wherein a first step size between the first set of quantized power steps is based on a first raw power command; and
selecting a second set of quantized power steps, wherein a second step size between the second set of quantized power steps is based on a second raw power command and is different than the first step size.

9. A hybrid vehicle control system comprising:
an engine;
an electric-machine; and
a powertrain controller programmed to:
convert a raw power command for the engine into a quantized power command; and
request the engine operate at a power level selected from one of a plurality of quantized power steps to meet the quantized power command,
wherein a step size between the quantized power steps varies based on the raw power command.

10. The hybrid vehicle control system of claim 9 wherein the controller is further configured to request the engine operate at a second quantized power step if the quantized power command falls between a first quantized power step and the second quantized power step and varies by more than a threshold value from the first quantized power step.

11. The hybrid vehicle control system of claim 10:
wherein the controller is further configured to request the engine operate at the first quantized power step if the quantized power command falls between the first and the second quantized power steps and varies less than a threshold value from the first quantized power step.

12. The hybrid vehicle control system of claim 10 wherein:
the threshold value varies in an inverse relationship based on the raw power command such that the threshold value is smaller for a greater raw power command than for a smaller raw power command.

13. The hybrid vehicle control system of claim 10 wherein:
the threshold value varies based on the raw power command.

14. The hybrid vehicle control system of claim 10 wherein:
the threshold value comprises an upper threshold value and a lower threshold value which vary based on the raw power command.

15. The hybrid vehicle control system of claim 9 wherein:
the step size varies based on the raw power command in an inverse relationship such that the step size is smaller for a greater raw power command than for a lesser raw power command.

16. The hybrid vehicle control system of claim 9 wherein the controller is further configured to:
request the engine operate at a first power level selected from a first set of quantized power steps, wherein a first step size between the first set of quantized power steps is based on a first raw power command; and
request the engine operate at a second power level selected from a second set of quantized power steps, wherein a second step size between the second set of quantized power steps is based on a second raw power command and is different than the first step size.

17. A method of operating a hybrid vehicle comprising:
converting a previous power command for an engine into a previous quantized power command;
operating the engine at a first power level selected from one of a plurality of previous quantized power steps having a first step size between each of the previous quantized power steps;
converting a current power command for an engine into a current quantized power command; and
operating the engine at a second power level selected from one of a plurality of current quantized power steps having a second step size between each of the current quantized power steps, the second step size being different from the first step size.

18. The method of claim 17 further comprising:
maintaining the current quantized power command if difference between the current power command and the quantized previous power command is larger than a threshold and otherwise setting the current quantized power command equal to the previous quantized power command.

19. The method of claim 17 further comprising:
during a tip-in event, maintaining the current quantized power command if the current power command is larger than the sum of the quantized previous power command and an upper threshold value; and
during the tip-in event, setting the quantized current engine power command equal to the previous quantized engine power command if the current engine power command is smaller than the sum of the quantized previous engine power command and the threshold value.

20. The method of claim 17 further comprising:

during a tip-out event, maintaining the current quantized engine power command if the current engine power command is smaller than the quantized previous engine power command subtracted by a lower threshold value; and during the tip-out event, setting the quantized current power command equal to the previous quantized power command if the current power command is larger than the previous quantized power command subtracted by the lower threshold value.

* * * * *